United States Patent [19]

Anderson

[11] Patent Number: 5,318,265
[45] Date of Patent: Jun. 7, 1994

[54] PORTABLE MAGNASCOPE

[76] Inventor: Walter J. Anderson, 60 Brewster Rd., North Weymouth, Mass. 02191

[21] Appl. No.: 850,421

[22] Filed: Aug. 3, 1992

[51] Int. Cl.⁵ .............................................. A44B 19/00
[52] U.S. Cl. .................................. 248/444.1; 248/279
[58] Field of Search .................... 248/444.1, 447, 452, 248/442.2, 279, 278, 283, 284, 286, 205.2

[56] References Cited

U.S. PATENT DOCUMENTS

| 4,582,285 | 4/1986 | Bello | 248/442.2 |
| 4,685,647 | 8/1987 | Calhoun | 248/444.1 |
| 4,747,572 | 5/1988 | Weber | 248/442.2 |
| 4,987,690 | 1/1991 | Aaldenberg et al. | 248/447 X |
| 5,104,088 | 4/1992 | Bakanowsky, III | 248/442.2 |
| 5,122,941 | 6/1992 | Gross et al. | 248/442.2 X |
| 5,161,767 | 11/1992 | Hansen | 248/444.1 X |

Primary Examiner—Ramon O. Ramirez

[57] ABSTRACT

Disclosed is an apparatus (MAGNASCOPE) for attaching and detaching a magnifier from a television or other generally planar member. The apparatus has a "T" shaped bar, and extending rod, two pivot rods, a lens holder and a means for securing the apparatus to the television or planar surface. The "T" bar has a substantially flat section that engages with an extending rod by means of a pivot rod. The opposite end of the extending rod contains an angulated pivot rod which carries the lens holder. The apparatus, in its entirety, is secured to a planar or vertical surface by means of a pressure sensitive material so as to deem it removable.

2 Claims, 3 Drawing Sheets

PORTABLE MAGNASCOPE

BACKGROUND OF THE INVENTION

The present invention relates to an apparatus for the magnification of objects, books, computer and television screens, for those whose vision is impaired or who otherwise have a sight impediment. (The invention, itself, is an apparatus for securing a magnifier in its desired location for use.)

Magnifiers are available in many sizes, shapes and forms to fit numerous applications. These devices typically include a magnifying lens encased in a holder. The size and shape of the lens (attached to a holder by VELCRO) vary upon application.

Although required for video assistance, present magnifiers are not readily adaptable to permit a vision impaired person to enjoy the sights of television.

Some attempts may have been made to develop a television magnifier. However, for the most part, these units required extensive manipulation by the user and, in some cases, could cause injury.

The present invention eliminates the above mentioned problems because only limited motion is required to place and position the MAGNASCOPE PORTABLE HOLDER. The device is easily placed on the top of a television or any other planar surface, both horizontal and vertical. A simple lifting motion will remove the device.

Accordingly, it is a primary objective of the invention to provide an apparatus which allows for the convenient attachment and use of a magnifier to a table top, television, computer, or other generally planar members, both horizontal and vertical.

Manufactured in a machine shop, each part is individually priced and labeled.

SUMMARY OF THE INVENTION

The present invention attains the preceding objectives and features by providing an apparatus for securing a magnifier to a television or other similar planar structure. The apparatus of the present invention comprises a "T" bar, rod, magnifier holder and rod pivots to allow a 360 degree rotation in all directions.

According to the invention, the "T" bar includes a rectangular section on top which receives a threaded pivot rod through a circular hole in the top of the block. This hole is roughly parallel to the horizontal axis of the combined "T" bar and rectangular block. A rod, substantially normal to the horizontal axis of the "T" bar and rectangular block, is connected to same by means of a hole in the threaded pivot rod. The hole in the threaded pivot rod is circular in geometry and its axis is perpendicular to the axis of the threaded pivot rod. The opposite end of the extending rod includes a circular hole to receive a smaller threaded pivot rod which is bent at approximately 90 degrees and contains threads at each end. The smaller threaded pivot rod is substantially normal to the extending rod. The smaller threaded pivot rod is designed to receive and hold the magnifying lens by means of VELCRO and a rectangular lens holder consisting of a rectangular component bent at 90 degrees and is usually normal to the axis of the smaller threaded pivot rod. The "T" bar may be removably secured to a television top or other generally planar surface by applying pressure to VELCRO pads. Typically, both the threaded pivot rod and the smaller threaded pivot rod are threaded to receive a threaded fastener. This will hold the unit as an assembly and allow for a 360 degree rotation in all directions. A resilient material is used to accomplish both the fastening and rotational motion. The fastener, usually known as a wing nut, disposed on the threaded pivot rod and the smaller threaded pivot is used to adjust and fix the magnifier to the desired position.

The magnifying lens, itself, is a standard item which is purchased.

DETAILED DESCRIPTION

Figure 1:
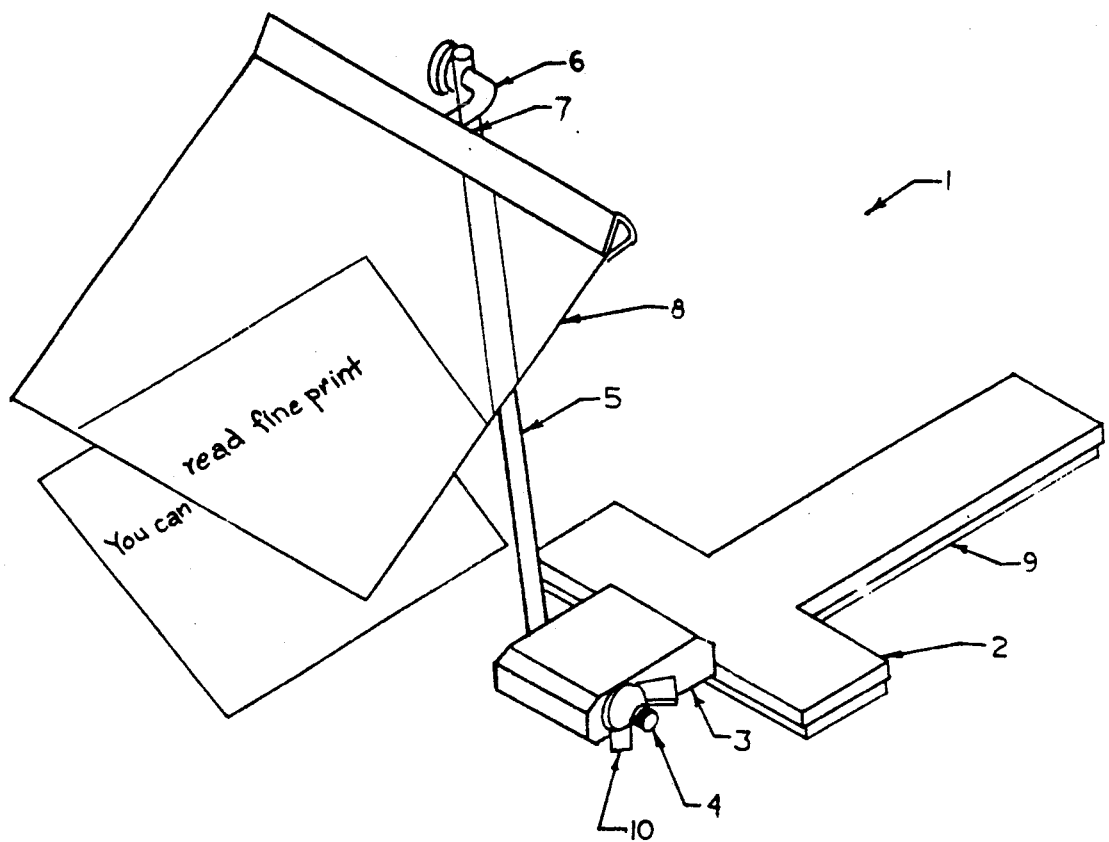
FIG. 1 is a perspective view illustrating the first embodiment of the invention.
Figure 2:
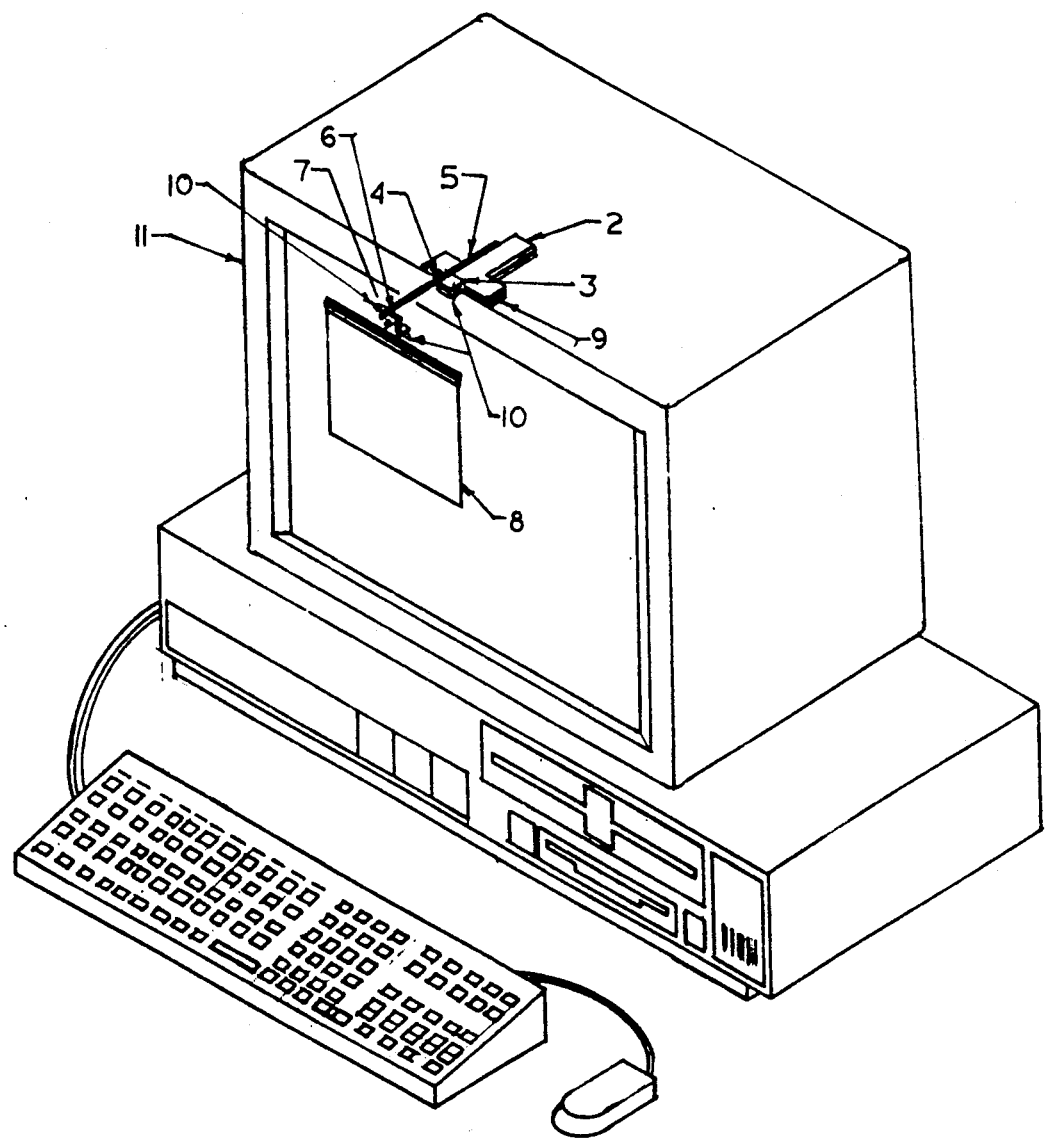
FIG. 2 illustrates the preferred embodiment of the invention placed atop a television, computer, or planar surface secured with VELCRO.
Figure 3:
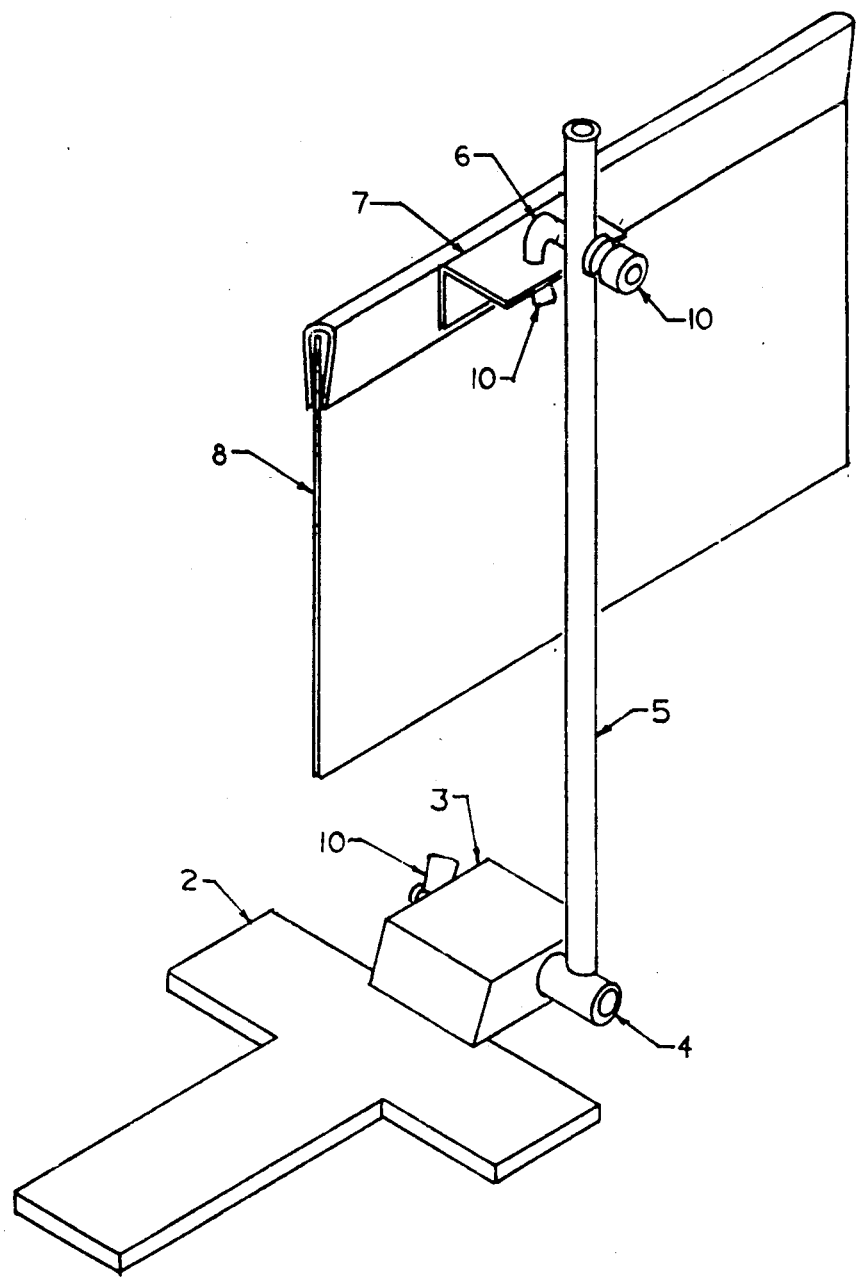
FIG. 3 is a perspective view illustrating the versatility in accordance with the present invention.

Referring to FIGS. 1 through 3, wherein like reference manuals refer to like parts, there is illustrated a MAGNASCOPE PORTABLE HOLDER (1). MAGNASCOPE PORTABLE HOLDER (1) includes a "T" bar (2) having a rectangular section (3) affixed to its top surface. "T" bar (2) with VELCRO is used to secure assembly to television top, side or other generally planar surfaces.

"T" bar (2), may be configured for use with other surfaces, planar or non-planar, including a wheelchair, armrest or the like. The "T" bar (2), includes a flat "T" section (2) having a rectangular block (3) on top; the rectangular top (3), is generally parallel to the longitudinal axis of the "T" (2).

The threaded pivot rod (4), is attached to the rectangular block by means of a threaded fastener on the threaded end and an articulating extended rod (5) is attached through a circular hole in the threaded pivot rod (4). This allows a 360 degree rotation in one plane. Rotation in still another plane normal to said plane is obtained by simply rotating the extended rod (5) about its own axis when the threaded fastener is loosened for adjustment. The opposite end of the extended rod carries a smaller threaded pivot rod (6), which is angulated approximately 90 degrees. The smaller threaded pivot rod is threaded on both ends for clamping to the extended rod (5). The smaller threaded pivot rod is oriented generally normal to the longitudinal axis of the extended rod (5). Each component part of this invention may be constructed of virtually any strong, durable material, such as aluminum, stainless steel or polymeric composites. Attached to the smaller threaded pivot (6), is a rectangular bracket which is generally normal to said pivot. The bracket (7) which holds the magnifier (8), is generally normal to the axis of the smaller threaded pivot (6) and generally parallel to the axis of the extended rod (5). This combination of the smaller threaded pivot rod (6) and bracket allow this joint to rotate 360 degrees in all directions. Bracket (7) consists of two rectangular sections, angulated 90 degrees apart with a round clearance hole is the smaller of the two rectangles to receive the smaller threaded pivot.

Preferably, bracket (7) includes a strip of VELCRO which allows the magnifying lens to be attached.

FIG. 1 illustrates an embodiment of the invention in which the "T" bar assembly and velcro (2) and (9) are used to secure the extending rod (5) and magnifier (8) to a planar member. The extended rod assembly (5) includes a threaded pivot rod (4) at one end attaching it to the "T" bar (2) while the other end has a smaller angulated pivot rod (6) attaching it to bracket (7) which carries the lens (8). The lens (8) is typically rectangular, however, other ergonomically feasible shapes may be used.

The preferred embodiment of the MAGNASCOPE PORTABLE HOLDER illustrated in FIG. 1 generally comprises a "T" bar (2), and extending rod (5) and two threaded pivots (4) and (6). The "T" (2) is approximately seven inches long and has a rectangular block (3) on top which is approximately one and one-quarter inches by one inch. Of course, the geometry and dimensions of the "T" (2) may be altered as the need to configure to different surfaces, and the like, arises. The threaded pivot rod (4) which unites the "T" (2) and extending rod (5) is threaded so that a nut can be disposed on those threads. The threaded pivot rod (4) and nut (10) are of sufficient size to meet both the ergonomic requirements of the user and provide a sufficient means to secure both parts together and yet still allow freedom of rotation. In operation, the extending rod (5) will rotate 360 degrees in two directions by means of swiveling extending rod (5) about its own axis and pivoting "T" (2) about the axis of the pivot rod. The cooperative action of the "T" (2) and pivot rod (4) will have infinite adjustment. The same infinite adjustment is also provided at the opposite end of the extended rod (5) with the smaller threaded angular pivot (6).

FIG. 2 illustrates the preferred embodiment of the invention resting on top of a computer. The MAGNASCOPE PORTABLE HOLDER is secured to the computer top (11) by the interaction of two dissimilar VELCRO materials (9). Once located, the MAGNASCOPE PORTABLE HOLDER can be adjusted to suit individual needs.

FIG. 3 illustrates still another perspective view for the purpose of part identification.

What is claimed is:

1. An apparatus for removable holding a magnifier on a generally planar surface comprising a T-shaped base having two ends, a substantially flat section, and a rectangular block section attached to one end of said two ends;

said block having a passageway parallel to said one end, a first rod rotatable within said passageway;

a second rod perpendicular and pivotally attached to one end of said first rod;

a third rod perpendicular and attached to the other end of said second rod;

a bracket attached to one end of said third rod for securing a magnifying lens; and means for securing the base to the surface;

wherein the lens can be vertically and horizontally adjusted.

2. The apparatus recited in claim 4 wherein the means for securing the base is VELCRO-type fasteners.

* * * * *